Aug. 11, 1931.  W. C. McDANIEL  1,818,235
LAMINATED GLASS
Filed July 23, 1928
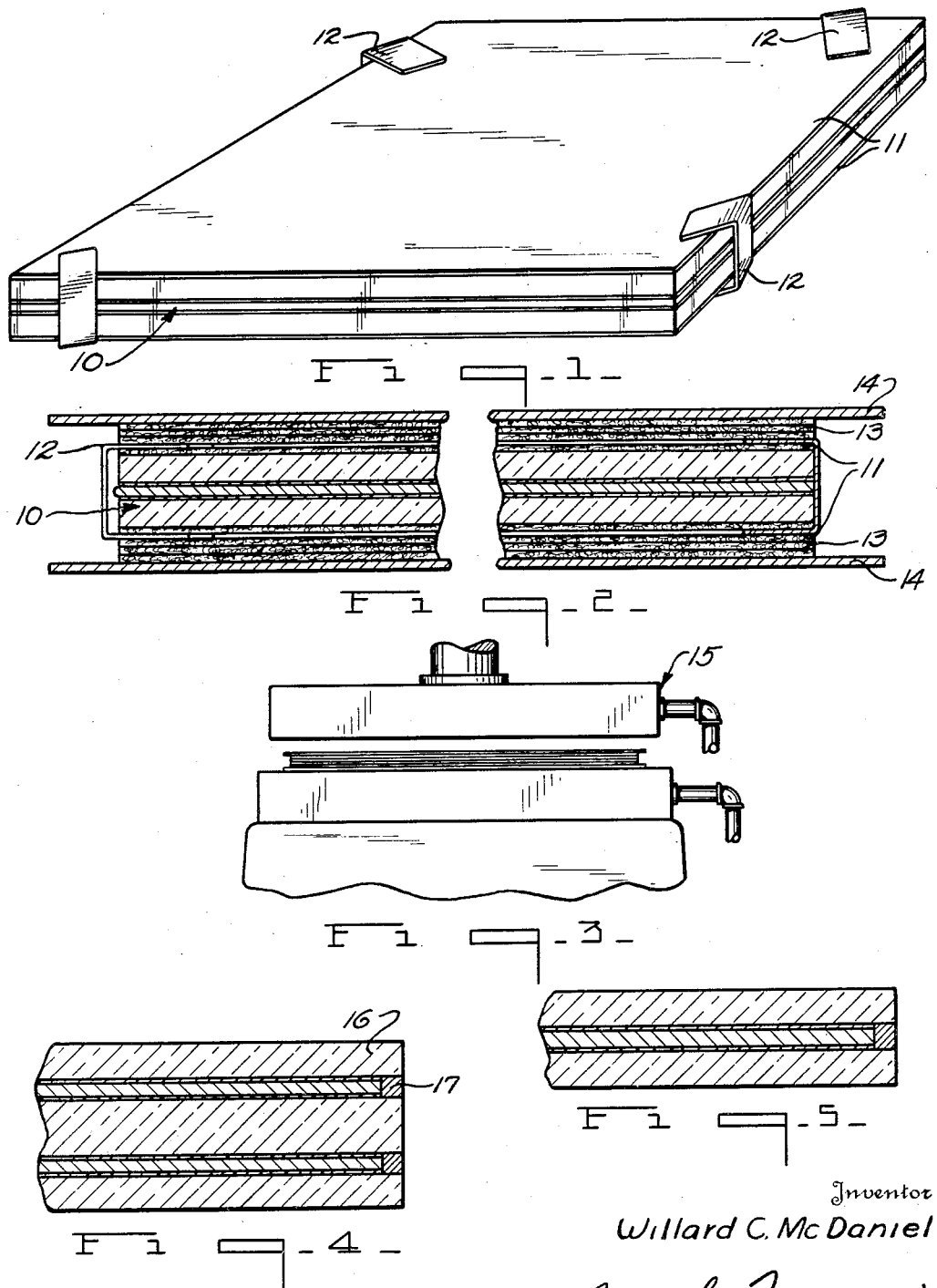
Inventor
Willard C. McDaniel
By Frank Fraser
Attorney Patented Aug. 11, 1931

1,818,235

UNITED STATES PATENT OFFICE

WILLARD C. McDANIEL, OF TOLEDO, OHIO, ASSIGNOR TO LIBBEY-OWENS-FORD GLASS COMPANY, OF TOLEDO, OHIO, A CORPORATION OF OHIO

LAMINATED GLASS

Application filed July 23, 1928. Serial No. 294,802.

The present invention relates to means adapted for use in the production of laminated glass.

An important object of the invention is to provide means whereby a plurality of laminations may be arranged in proper superimposed relationship and held against slippage while said laminations are permanently bonded together.

Another object of the invention is to provide means for use in the production of laminated glass wherein the laminations are arranged in sandwich form after which a sheet of compressible material is arranged on each side of the sandwich, the sandwich and compressible sheets being held in proper relationship by means of "stickers" which are removed after the laminations have been permanently bonded together.

A further object of the invention is to provide means designed to prevent slippage between the laminations of a sandwich during the pressing thereof, the said means being applied to and used in connection with the sandwich in a manner that the possibility of strains being set up in the sheet due to the use of said means is reduced to a minimum.

Still another and important object of the invention is to provide such means which are adapted to be applied to the sandwich in a manner that the non-brittle lamination can "flow" without being unnecessarily retarded, as far as the "sticker" is concerned.

Other objects and advantages of the invention will become more apparent during the course of the following description when taken in connection with the accompanying drawings.

In the drawings forming a part of this application and wherein like numerals are employed to designate like parts throughout the same, Fig. 1 is a perspective view showing a laminated sandwich with "stickers" in proper position.

Fig. 2 is a vertical section through a sandwich illustrating the same suitably assembled for pressing.

Fig. 3 is a diagrammatic representation of a press, and

Figs. 4 and 5 are fragmentary sectional views of two different forms of commercial products.

In the production of laminated glass two or more sheets of glass and one or more sheets of non-brittle material are united to form a composite non-shatterable sheet. There are numerous ways in which laminated glass can be processed, but in practically all of the cases some form of liquid or bonding medium is used. To obtain the bond between the laminations it is quite customary to use a sheet of cellulose composition material as the non-brittle membrane or portion of the laminated sheet, and to obtain a bond between it and the glass sheets some form of bonding medium or cement is used. Due to the liquid characteristics of the bonding medium, after the laminations have been placed in sandwich form there is a tendency for the laminations to slip relative to each other during the pressing operation. It is quite important that this slippage be overcome as ordinarily the glass sheets are cut to the proper size before the laminated sheet is produced because of the difficulties in cutting laminated glass after it has been made.

When producing laminated glass in accordance with some processes due to the heat and other conditions, the non-brittle sheet is extruded or flowed from the edges of the sandwich, that is due to the pressure and other conditions the size of the non-brittle sheet is greater after the pressing than before. If the non-brittle sheet and glass used are of the same size during the beginning of the operation it will be seen that when the sandwich or finished product is removed from the press that the non-brittle sheet will be slightly larger. It is rather essential that the flowing of the non-brittle sheet from between the glass sheets be un-interrupted as far as any external means is concerned. If the flowing of the non-brittle sheet be interrupted at various points the tendency toward the formation of strains in the laminated product takes place.

Referring to Fig. 1 the numeral 10 designates a sandwich formed from two sheets of glass and a sheet of non-brittle material, the sheets of glass and non-brittle sheets have been properly processed such as by the application of a bonding medium. Arranged on each side of the laminated sandwich is a sheet of compressible material 11, which, in effect, form a cushion, and in actual practice I have found the use of blotting paper satisfactory for this purpose. In carrying out the present invention the sheets of blotting paper or the like 11 are cut to the same size as the sandwich 10, but it will of course be understood that any other suitable material can be used such as for instance rubber, asbestos, etc., instead of the blotting paper above mentioned. After the cushion members 11 have been cut to size and one placed on each side of the sandwich 10 "stickers" 12 are used to hold the sandwich and cushion means in position.

The "stickers" 12 may be ordinary gummed paper. The term "stickers" is used in this specification and the claims to mean broadly any adhesive member used to prevent slippage between the laminations. It is preferred that the "stickers" be applied in a manner to prevent relative movement or slippage between the various sheets comprising the laminated sandwich. By arranging one at each corner as illustrated in Fig. 1, it has been found that the laminations will be held against relative movement. Attention is directed to the fact that the "stickers" 12 adhere to the cushion members 11 instead of to the surfaces of the glass sheets.

In those cases where the non-brittle material has a tendency to flow or extrude from between the glass sheets I have found it very desirable to arrange the "stickers" at an angle in the manner illustrated so that there is substantially line contact only between the "stickers" and the edges of the glass sheets. As there is line contact only the non-brittle sheet can flow without being retarded except at the very line of contact between said "stickers" and the edges of the laminated sandwich. This arrangement of the "stickers" is considered very important as it reduces to a minimum the retardation of the flowing of the non-brittle sheet and thus removes a cause for the introduction of strains within the laminated product.

After the cushion members 11 have been associated with the sandwich 10 as shown in Fig. 1 additional cushion means 13 are arranged as shown in Fig. 2. In this particular instance three additional sheets of compressible material have been placed on each side of the sandwich and compressible sheets 11. The number of additional compressible sheets or cushion members 13 required is dependent upon the thickness of each sheet, pressures used, etc., and although it is important that the sheets 11 be of the same size as the sandwich 10, the members 13 can be the same size or larger.

The numeral 14 designates preferably two metallic plates one of which is placed on each side of the sandwich and in contact with the outermost sheets 13. The plates 14 are preferably of thin flexible metal. The entire assembly shown in Fig. 2 may then be placed in a press designated in its entirety by the numeral 15 and is subjected to the combined action of heat and pressure to obtain an efficient and permanent bond between the laminations. This invention is not restricted to any method of treating the sandwich while in the press and any desired range of pressures and temperatures can be used to give the desired results.

In Fig. 4 is illustrated a so-called "bulletproof" type of glass comprising three sheets of glass and two sheets of non-brittle material. To protect the bond between the laminations of the sheet 16, a seal 17 is used. In Fig. 5 regular non-shatterable glass comprising two sheets of glass and a sheet of non-brittle material is shown.

One of the big problems in the production of laminated glass is to obtain an efficient bond between the laminations and to so obtain the bond that the finished sheet will not subsequently develop so-called "after-cracks" The term "after-cracks" is used to designate a crack that appears in the glass sheets after the sheet has been formed. Such cracks do not appear during the pressing operation but on the other hand appear subsequent to the removal of the sheet from the press. "After-cracks" appear at various times after the sheet has been formed, in fact they may show up a month or so after the sheet has been pressed. Some laminated glass is produced by using plate glass in its structure while other laminated glass is formed by using ordinary unground and unpolished window glass. Although it would seem that "after-cracks" would not appear in laminated glass formed from plate glass, nevertheless such "after-cracks" do appear unless very exceptional care is exercised in the manufacture thereof.

If the "sticker" members 12 are joined directly to the face of the glass sheets in the sandwich 10, and even though cushion means are placed between the sandwich and the "stickers" 12 and the plates of the press 15, the "stickers" cause a strain to be introduced in the glass sheet. I have found however, that these strains can be eliminated by placing at least one of the compressible members 11 between the "stickers" and the glass sheets. Probably the thickness of the "sticker" is absorbed in the compressible members 11 so that an uneven pressure is applied to the laminated sandwich. At any rate it has been found in actual practice that the arrangement of the "stickers" as above set forth gives much more satisfactory results than when the "stickers" are applied directly to the surface of the glass sheets. Further better results are obtained in the main when the "stickers" are positioned at an angle as illustrated than when they are placed so that they are at 90 degree angles with respect to the edge of the sandwich. Even though the "stickers" are arranged at an angle and with the compressible members between the "stickers" and the laminations, relative movement is nevertheless prevented between the laminations. As shown in Fig. 2 at the left thereof, the non-brittle sheet extends beyond the edges of the glass sheets. This extension occurs when the non-brittle membrane flows during the joining of the laminations and can be readily removed by a sharp knife or the like.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing laminated glass, consisting in forming a sandwich from the laminations to be joined, arranging a compressible sheet on each side of the sandwich, applying means adhering to the two compressible sheets to prevent relative movement between the laminations comprising the sandwich, then applying additional compressible means on each side of the sandwich, and then subjecting the entire assembly to the action of pressure to obtain a bond between the laminations.

2. The process of producing laminated glass, consisting in forming a sandwich from the laminations to be joined, arranging a compressible member on each side of the sandwich, applying "stickers" at the edges of the sandwich and compressible members to prevent slippage between the laminations, and then applying pressure to the assembly thus formed to obtain a bond between the laminations.

3. The process of producing laminated glass, consisting in forming a sandwich from the laminations to be joined, arranging a compressible member on each side of the sandwich, applying "stickers" at the edges of the sandwich and compressible members to prevent slippage between the laminations, then arranging additional compressible members on each side of the assembly thus formed, and then applying pressure to the entire assembly to obtain a bond between the laminations.

4. The process of producing laminated glass, consisting in forming a sandwich from the laminations to be joined, arranging a sheet of compressible material on each side of the sandwich, said sheets of compressible material being of identical size with the sandwich, applying "stickers" at the corners of the sandwich and overlapping the "stickers" over the compressible members, then arranging additional compressible members on each side of the sandwich, and pressing the assembly thus formed to unite the laminations of said sandwich.

5. The process of producing laminated glass, consisting in forming a sandwich from the laminations to be joined, and arranging "stickers" thereon to prevent relative movement between said laminations, said "stickers" being arranged in a manner that they have substantially line contact only with the edges of the sandwich.

6. The process of producing laminated glass, consisting in forming a sandwich from the laminations to be joined, arranging a compressible sheet on each side of the sandwich, applying means adhering to the two compressible sheets to prevent relative movement between the laminations comprising the sandwich, and then applying pressure to the assembly thus formed to obtain a bond between the laminations.

7. The process of producing laminated glass, consisting in forming a sandwich from the laminations to be joined, arranging a compressible member on each side of the sandwich, applying "stickers" thereon to prevent relative movement between the laminations, said "stickers" being arranged in a manner that they have substantially line contact only with the edges of the sandwich, and then pressing the assembly thus formed to unite the laminations of said sandwich.

Signed at Toledo, in the county of Lucas and State of Ohio, this 29th day of June, 1928.

WILLARD C. McDANIEL.